UNITED STATES PATENT OFFICE.

JUAN CRAVERI, OF BUENOS AYRES, ARGENTINA.

COMPOSITION OF MATTER FOR WAX TAPERS.

SPECIFICATION forming part of Letters Patent No. 658,977, dated October 2, 1900.

Application filed November 17, 1899. Serial No. 737,311. (No specimens.)

*To all whom it may concern:*

Be it known that I, JUAN CRAVERI, a subject of the King of Italy, residing at No. 419 Calle Defensa, in the city of Buenos Ayres, Argentina, have invented a new and useful Composition of Matter to be Used for Wax Tapers for Friction-Matches, of which the following is a specification.

My invention relates to the preparation of a new kind of taper to be used as the body of friction-matches and in which are united qualities of usefulness and economy superior to those of the matches of this class actually in use.

The taper of my invention is composed, essentially, of a mixture of ceresin or of ozocerite or of paraffin with purified colophony or other resins, to which are added metallic oxids, inorganic salts, organic salts, or organic compounds, such as do not impede combustion. With this mixture I obtain a good composition for the preparation of tapers designed for friction-matches.

Among several formulas embodying my invention which give equally good results the following formula has proved most economical: white ceresin, forty parts; purified colophony, fifteen parts; sulfate of lime, ($CaSO_4$,) thirty-two parts; oxid of zinc, ($ZnO$,) seven parts; nitrate of potassium, ($KNO_3$,) six parts; total, one hundred parts.

As above indicated, the ceresin may be substituted by ozocerite or by paraffin. The ceresin and the resin are melted over a slow heat, the latter having been previously purified, after which there are added the sulfate of lime, oxid of zinc, and nitrate of potassium. After shaking well dip in this mixture the cotton twine or wicking of which the tapers are to be formed, which is then manipulated by the several machines employed in the usual well-known process of making such tapers from stearine. The ceresin, resin, nitrate of potassium, and wicking maintain the flame when the match is lighted, while the sulfate of lime and oxid of zinc impart durability and whiteness to the taper.

By the use of this preparation the following advantages are obtained, among others: first, an economy of from forty to fifty per cent. of the cost of the tapers; second, a longer period of combustion than that furnished by stearine; third, when the matches are used in the wind the melted wax does not run down on the fingers, as with those of stearine, as the flame extends with less rapidity.

Having thus described my invention, that which I claim is—

A composition of matter for making wax matches and the like, consisting of white ceresin forty parts, purified colophony fifteen parts, sulfate of lime thirty-two parts, oxid of zinc seven parts, and nitrate of potassium six parts, substantially as described.

In testimony whereof I have signed my name to this specification in the presence of two subscribing witnesses.

JUAN CRAVERI.

Witnesses:
GUSTAVO M. BREUER,
RALPH W. HUNTINGTON.